United States Patent [19]
Imhof

[11] Patent Number: 4,748,096
[45] Date of Patent: May 31, 1988

[54] FIBER STRUCTURE-ELECTRODE FRAMEWORK OF METALLIZED PLASTIC FIBERS WITH WELDED-ON CURRENT-CONDUCTING LUG

[75] Inventor: Otwin Imhof, Nuertingen, Fed. Rep. of Germany

[73] Assignee: Deutsche Automobilgesellschaft mbH, Hanover, Fed. Rep. of Germany

[21] Appl. No.: 100,351

[22] Filed: Sep. 23, 1987

[30] Foreign Application Priority Data

Sep. 24, 1986 [DE] Fed. Rep. of Germany ....... 3632352

[51] Int. Cl.⁴ ............................................. H01M 2/26
[52] U.S. Cl. .................................... 429/211; 429/235
[58] Field of Search ............... 429/211, 235, 161, 236, 429/237

[56] References Cited

U.S. PATENT DOCUMENTS

| | | | |
|---|---|---|---|
| 2,861,115 | 11/1958 | Berg | 429/237 |
| 3,607,432 | 9/1971 | Johnson | 429/211 |
| 4,439,281 | 3/1984 | Schneider et al. | 429/211 |
| 4,687,719 | 8/1987 | Benda et al. | 429/235 |

Primary Examiner—Donald L. Walton
Attorney, Agent, or Firm—Barnes & Thornburg

[57] ABSTRACT

A fiber structure-electrode framework of metallized plastic fibers with reinforced edge and with welded-on current-conducting lug in which the current-conducting lug is provided along the edge abutting at the fiber framework with an essentially steplessly terminating chamfer that forms an angle of 10° to 50° with the lug. The welded connection of the fiber framework with the current-conducting lug starts 1 to 3 mm. above the beginning of the chamfer on the non-chamfered part of the current-conducting lug and the fiber framework starting from the strongly compressed part which carries the welding seam, tapering on both sides approximately continuously to the full thickness of the fiber structure.

2 Claims, 1 Drawing Sheet

FIBER STRUCTURE-ELECTRODE FRAMEWORK OF METALLIZED PLASTIC FIBERS WITH WELDED-ON CURRENT-CONDUCTING LUG

BACKGROUND AND SUMMARY OF THE INVENTION

The present invention relates to a fiber structure-electrode framework of metallized plastic fibers having welded-on, current-conducting lugs.

For connecting fiber structure-electrode frameworks of metallized plastic fibers, for example, of nickel-plated polyolefin-felt or -fleece material, it is known to slot the edge of the electrode framework, to slide the current-conducting lug into this slot and then to weld together the electrode framework with the current conducting lug. However, such a possibility is very expensive and is realizable only with small quantities. With larger quantities, the current-conducting lug is placed on the galvanically reinforced edge of the fiber structure-electrode framework and is welded together with the same under pressure. The current-conducting lug thereby consists of a correspondingly shaped sheet metal member, especially of nickel or of nickel-plated sheet metal parts. During the welding of the lugs with the fiber structure-electrode framework, the bottom edge of the current-conducting lug is pressed into the metallized fiber framework, as a result of which a strong compression of the metallized fiber structure-electrode framework takes place over the reinforced edge. This will lead to cracks in the metallized electrode framework within the area of the weld and to a small supporting cross section. This all leads to a low strength of the welded connection and therewith to rejection during the further processing of the refilled fiber structure-electrodes, for example, during the mechanical impregnating, the welding of plate sets, the separating and the forming. Furthermore, the capacity of completed batteries suffers if during the operation an insufficient welded connection exists at individual plates which with an alternating load will not withstand the occurring forces and moments.

The present invention is concerned with the task to provide a fiber structure-electrode framework of metallized plastic fibers with reinforced edge and with welded-on current-conducting lug, in which no crack formation occurs in the fiber structure-electrode framework in direct proximity of the welded connection and in which the welded connection exhibits a high strength not only under tensional loads, but also in the cross direction and which makes it possible to manufacture electrodes with favorable electrical transition resistances and great lengths of life so that the same can also be used in traction batteries.

The underlying problems are solved according to the present invention in that the current-conducting lug is provided with an essentially steplessly terminating chamfer at the side abutting at the fiber framework, which forms an angle of 10° to 50° with the lug, in that the welding of the fiber framework is undertaken essentially on the non-chamfered part of the current-conducting lug up to 5 mm. above the beginning of the chamfer, and in that the fiber framework is compressed within the area of the welding seam and starting from the welding seam runs out on both sides approximately continuously to the full thickness. The current-conducting lug is thus provided on the side abutting at the fiber framework with an essentially steplessly terminating chamfer which forms an angle of 10° to 50°. The welding of the fiber framework lies essentially up to 5 mm. above the beginning of the chamfer on the non-chamfered part of the current-conducting lug. As a strong heating of the lug as well as of the fiber framework takes place during the welding, the welding in some cases may extend into the area of the chamfer. During the welding, the fiber framework is permanently compressed within the area of the welding seam by the contact pressure of the welding electrodes. This compressing takes place above all in the reinforced edge of the fiber structure-electrode framework which has mechanically a higher stability than the rest of the electrode framework. The galvanic reinforcement of the edge is known and is achieved by a greater metal deposit on the fibers of the electrode framework (DE-PS No. 31 42 091). Starting from the welding seam, a tapering to the full thickness of the fiber framework which is approximately symmetrical on both sides, is then achieved conditioned by the chamfer as well as by a corresponding construction of the counter electrode. As a result thereof, stresses in the electrode framework are far-reachingly avoided. This is particularly favorable for thicker electrode frameworks, especially those with a thickness of 1.5 to 8 mm. Metallized plastic fiber frameworks, especially felts, needle felts, fleeces and the like are used as electrode frameworks. The metallization takes place according to the conventional techniques whereby in particular nickel or copper is used as metallic coating on the fibers. The electrode frameworks are provided at the edge, where the current-conducting lug is to be attached, with an edge reinforcement which is achieved by a thicker metal coating on the individual fibers. The plastic materials suitable also for textile fibers, for example, polyolefins, polyamides, polyacrylnitriles, etc. are suitable as material for the fibers of the electrode framework, insofar as they are stable with respect to the electrolytes with which they come subsequently into contact.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
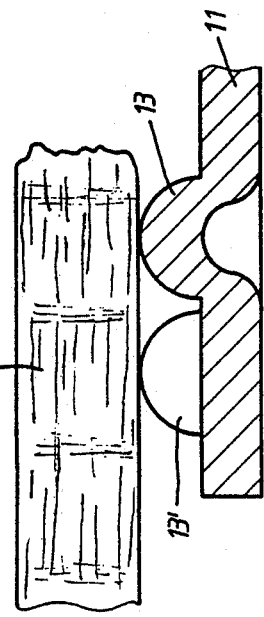
FIG. 1 is a schematic partial longitudinal cross-sectional view through a heretofore customary connection of a nickel-plated current lug with a fiber structure-electrode framework prior to the welding operation.
Figure 2:
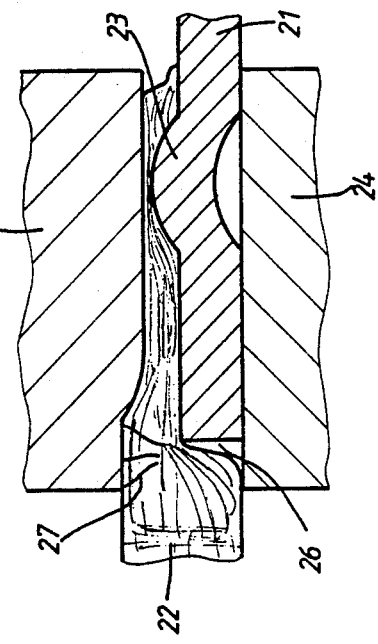
FIG. 2 is a view similar to FIG. 1 and showing the framework after the welding operation.

Referring now to the drawing wherein like reference numerals are used in the various views to designate like parts, and more particularly to FIG. 1, the current-conducting lug 11 illustrated therein is provided with two embossed hump rows 13 and 13'. The end of the fiber structure-electrode framework is placed on the hump rows 13 and 13'. The welding electrodes 24 and 25 between which the current-conducting lug 21 and the fiber structure-electrode framework 22 are disposed can be seen in FIG. 2. Owing to the high abutment pressure of the welding electrodes 24 and 25, the hump 13 according to FIG. 1 has been deformed into the more flat hump 23. Furthermore, it can be seen from FIG. 2 that the fiber structure has been strongly compressed over a relatively large distance by the welding electrode 25. At the end 26 of the current-conducting lug, a practically transitionless cross-sectional change takes place which may lead to cracks 27. After the removal of the welding electrodes 24 and 25, the illustrated shpae of the current-conducting lug 21 and of the fiber structure-electrode framework 22 remains essentially preserved.

FIG. 3 again shows a current-conducting lug 31 as well as the fiber structure-electrode framework 32. The current-conducting lug 31 is provided with a chamfer or bevel 38. The chamfer or bevel 38 is to form an angle of about 10° to about 50° with the lug. If the angle becomes too small, then the chamfer becomes too long which leads to a reduction of the capacity of a corresponding-electrode whereas if the chamfer angle becomes larger than 50°, then the transition from the compressed zone of the fiber structure-electrode framework to the uncompressed part becomes excessively abrupt so that the danger exists that stress cracks will occur as in the prior art. The welding takes place essentially on the non-chamfered part of the current-conducting lug 31. The fiber structure-electrode framework is to protrude for that purpose up to 5, especially approximately 1 to 3 mm., into this non-chamfered area. If one falls significantly below this value of 1 mm., then a safe weld is no longer assured always whereas if one exceeds the value of 3 mm., then the danger exists that the welding also takes place in the non-reinforced edge of the fiber structure-electrode framework which may lead to a strength loss in the connection.

Figure 3:
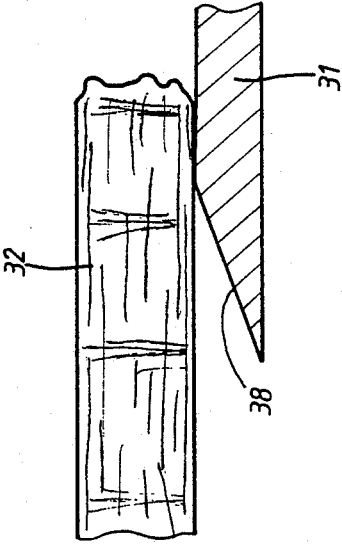
FIG. 3 is a schematic partial longitudinal cross-sectional view through a fiber structure-electrode framework with a current-conducting lug which is chamfered in accordance with the present invention, prior to welding.
Figure 4:
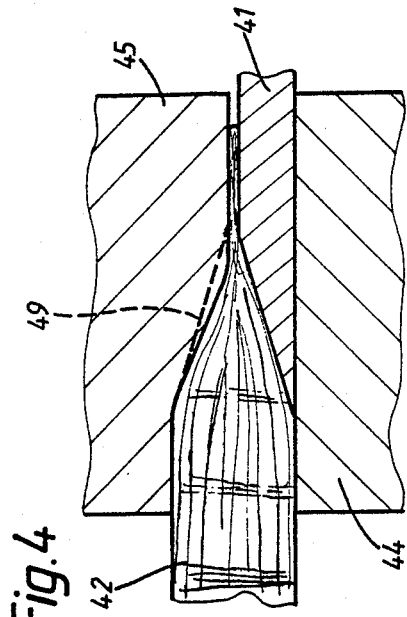
FIG. 4 is a schematic partial longitudinal cross-sectional view similar to FIG. 3, and illustrating the fiber structure-electrode framework after the welding operation.

FIG. 4 illustrates the current conductor and fiber structure-electrode framework according to FIG. 3 after the welding operation. One recognizes the current conductor lug 41 and the fiber structure framework 42 as well as the lower welding electrode 44 and the upper welding electrode 45. The strongly compressed part of the fiber structure-electrode framework is limited to the area adjoining the non-chamfered part of the current-conducting lug. Starting from the welding seam in the non-chamfered part of the current-conducting lug, the fiber structure-electrode framework runs out on both sides approximately continuously to the full thickness.

On the side of the fiber structure-electrode framework opposite the current-conducting lug, this is achieved by a corresponding construction of the welding electrode. This transition is achieved in the illustrated embodiment by a slightly curved shape of the upper electrode 45. However, it is also possible to permit the transition to proceed continuously, as, for example, illustrated by the dash line 49.

Owing to this gradual transition from the strongly compressed part carrying the welding seam to the full thickness of the fiber structure-electrode framework, the edge of the fiber structure-electrode framework which is metallized to a greater extent and thus is particularly stable, is loaded and deformed the most. A lesser force is exerted on the portions lying in front thereof which deforms this portion less strongly so that the deformation of the less strong metallized fiber structure-electrode framework becomes smaller and approaches zero. Compared to a customary fiber structure-electrode framework with welded-on current-conducting lug, the strength of the connection in the transition range increased by more than 60% in the fiber structure-electrode framework according to the present invention in which the current-conducting lug has a chamfer or bevel, as compared to a prior art fiber structure-electrode framework. The reject numbers also decrease therewith and a fiber structure-electrode constructed in this manner is then utilizable not only in stationary applications, but can then be used also in traction batteries without danger. The stress peaks are also smaller owing to the continuously running-out of the electrode framework from the strongly compressed condition at the welding place to the specified thickness as a result of the chamfered current-conducting lug and the high current loadability of battery cells equipped with such electrode frameworks is also improved.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A fiber structure-electrode framework of metallized plastic fibers with a reinforced edge and a welded-on current-conducting lug, the current-conducting lug being provided on the side abutting at the fiber framework with an essentially steplessly terminating chamfer that forms an angle of about 10° to about 50° with the lug, the welded connection of the fiber framework being located essentially on the non-chamfered part of the current-conducting lug up to about 5 mm. above the beginning of the chamfer, and the fiber framework being compressed within the area of the welding seam and starting from the welding seam tapering on both sides thereof approximately continuously to the full thickness thereof.

2. A fiber structure-electrode framework according to claim 1, wherein the fiber framework has a thickness of about 1.5 to about 8 mm.

* * * * *